(12) United States Patent
Gushman et al.

(10) Patent No.: US 7,954,366 B2
(45) Date of Patent: Jun. 7, 2011

(54) ENVIRONMENTAL ENCLOSURE FOR VEHICLE PROPERTY TESTING

(75) Inventors: Richard W. Gushman, Rochester Hills, MI (US); Mark D. Womack, Lake Orion, MI (US); David J. Gunnels, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 12/264,332

(22) Filed: Nov. 4, 2008

(65) Prior Publication Data
US 2010/0107749 A1 May 6, 2010

(51) Int. Cl.
*G01M 17/00* (2006.01)
(52) U.S. Cl. .................................. 73/116.01; 73/118.01
(58) Field of Classification Search ............... 73/116.01, 73/116.02, 116.03, 116.05, 116.06, 116.07, 73/116.08, 116.09, 117.01, 118.01
See application file for complete search history.

(56) References Cited

U.S. PATENT DOCUMENTS

| | | | | |
|---|---|---|---|---|
| 4,941,347 A | * | 7/1990 | Iijima et al. ................. | 73/116.02 |
| 4,951,498 A | * | 8/1990 | Kiuchi ........................ | 73/116.02 |
| 5,167,146 A | | 12/1992 | Hostetter | |
| 5,509,301 A | * | 4/1996 | Takano et al. ............... | 73/116.02 |
| 5,540,109 A | * | 7/1996 | Hobbs ........................... | 73/865 |
| 5,574,226 A | * | 11/1996 | Reuther et al. .................. | 73/669 |
| 5,629,476 A | * | 5/1997 | Sondey ....................... | 73/116.02 |
| 5,675,098 A | * | 10/1997 | Hobbs .......................... | 73/865.6 |
| 6,044,696 A | * | 4/2000 | Spencer-Smith ........... | 73/118.01 |
| 6,691,573 B2 | * | 2/2004 | Silvagi et al. .................... | 73/571 |
| 7,127,958 B2 | * | 10/2006 | Blewett et al. ............... | 73/865.6 |
| 7,347,087 B2 | * | 3/2008 | Rankin et al. .............. | 73/118.01 |
| 7,849,734 B2 | * | 12/2010 | Moritani et al. ............ | 73/116.05 |
| 2005/0235763 A1 | * | 10/2005 | Blewett et al. .................. | 73/866 |
| 2010/0018300 A1 | * | 1/2010 | Cline et al. ................. | 73/116.06 |

OTHER PUBLICATIONS

"Drive-In Test Chambers" www.climatictesting.com Climatic Testing Systems, Warminster, PA 18974.
"Environmental Test Chamber", US Statutory Invention Registration No. H229, Published Mar. 3, 1987. Inventor David E. Phillips.

* cited by examiner

*Primary Examiner* — Eric S McCall
(74) *Attorney, Agent, or Firm* — Quinn Law Group, PLLC

(57) ABSTRACT

An environmental test enclosure for modifying the temperature of a vehicle test property is presented. The enclosure includes a movable pallet assembly that is operable to deliver the test property to and from the property test site. The movable pallet assembly includes a base plate that is configured to attach to and support the test property thereon. A plurality of sidewalls project upward from the base plate to surround the test property. A flexible cover is mounted to the overhead structure of the test site, and configured to transition between an open position, in which the cover is in a raised and generally folded state, to a closed position, in which the cover is in a lowered state and attachable to the pallet assembly. The flexible cover cooperates with the movable pallet assembly when attached thereto to define an enclosed and substantially thermally insulated space around the test property.

19 Claims, 4 Drawing Sheets

ENVIRONMENTAL ENCLOSURE FOR VEHICLE PROPERTY TESTING

TECHNICAL FIELD

The present invention relates generally to test cells for motor vehicles, and more particularly to environmental enclosures for vehicle property testing.

BACKGROUND OF THE INVENTION

As part of the ongoing objective of automotive manufacturers to produce high quality automobiles, every effort is made to ensure that new vehicles are quiet and operate correctly under normal operating conditions. In the field of motor vehicles, and particularly in the production of internal combustion engine assemblies, testing is normally done on a large scale basis. Testing is traditionally performed in a continuous manner on a variety of different types of engines at any one point in time at a single test facility. Test engineers and technicians often use a dressing area which allows the engines to be prepped or "dressed" prior to entering the engine test cell. As a further means of facilitating the testing process and minimizing the down time of the test room, a test operator often may use engine transport systems to expedite the preparation and delivery of the engine to the test room.

Original equipment manufacturers (OEMs) of high quality mechanical power sources, such as motors, engines, and other prime movers, almost invariably test the power source prior to releasing the same for sale to ensure that it performs properly and up to its rated capability. Dynamometer testing apparatuses (or "dyno" for short) of various types are used to determine the performance characteristics of motor and engine assemblies, transmissions, powertrain architectures, and of vehicles powered by such motor and engine assemblies. A dyno can be used, for example, to measure the torque and rotational speed from which power produced by an internal combustion engine can be calculated.

Engines are often tested in order to verify their performance under conditions which substantially reproduce actual working conditions. Some such conditions include extreme temperature environments. Accordingly, engine, transmission, and powertrain development activities frequently require hardware test temperatures be higher or lower than the prevailing ambient temperature. For instance, many validation test procedures require a non-ambient soak temperature prior to the initiation of a test. The majority of these procedures call for a soak period that ensures the test article and fluids (e.g., engine coolant, engine oil, transmission fluid, differential oil, intercooler cooling fluid, fuel, etc.) have reached a pre defined, stable temperature. Once the temperature is reached, the test is executed. By way of example, certain procedures involve eight hours of soak time for a 20-30 minute run time. These procedures will test hardware and provide calibration data for engine and transmission controllers.

In the state of the art, this type of environmental testing is usually done in a specially built, rigid climatic chamber or dedicated environmental test cell, built inside an engineering test facility and used specifically for that purpose. Conventional climatic test cells are large rooms which are at least partly insulated from the outside environment. Equipment to secure and support the test piece, such as a test bench or platform, is rigidly installed inside the test rooms, as is the dynamometer and any other equipment and instrumentation necessary for testing. The test rooms are also connected to ducts which remove heat generated through operation of the test assembly. Many test cells are equipped with pipes to discharge associated exhaust fumes, and supply lines to deliver needed fluids, as well as the necessary cabling for electric power supply and for the acquisition of the measurement signals.

Rigid testing facilities in current use suffer various practical drawbacks. In the first place, prior art environmental testing chambers are generally limited to a single, definitive use, which often ties up precious space and testing equipment. This, in turn, causes a considerable lengthening of the times required to carry out the tests, which reduces the overall efficiency of the testing facility. Secondly, the testing room itself creates a less than optimal working environment for operators who need to setup and break down the test property before and after soaking at extreme temperatures. Third, rigid environmental enclosures tend to be very large, and are not easily adaptable to new testing equipment, procedures, and test property configurations. Lastly, current production specialized climatic test chambers are very expensive, both in initial build and setup as well as maintenance costs.

SUMMARY OF THE INVENTION

The present invention offers full environmental testing capabilities, which can be performed in fueled engine or powertrain test cells without the limitations incurred by the use of a rigid climatic enclosure or a dedicated environmental test cell. The environmental enclosures of the present invention require significantly less floor space than prior art climatic test chambers, and reduce the amount of time required to run non-ambient temperature testing, appreciably improving the overall efficiency of the testing facility. The present invention also allows for off-line temperature soaking of vehicle test properties (e.g., engine, transmission, engine and transmission assembly, full powertrain, etc.), freeing up valuable testing equipment. In addition, the environmental enclosures of the present invention offer realized reductions in initial build and setup costs, as well as maintenance expenses. Finally, the design of the present invention offers a much more operator-friendly work environment than prior art facilities.

According to one preferred embodiment of the present invention, an environmental enclosure is provided for modifying the temperature of a motor vehicle test property. The environmental enclosure includes a movable pallet assembly that is configured to support the test property thereon. The movable pallet assembly is operable to deliver the test property to and from the property test site. A flexible cover is operatively mounted to the test site. The flexible cover is configured to transition back and forth between a first position, in which the cover is in a generally folded state, and a second position, in which the cover is extended and operable to attach to the pallet assembly. When the cover is attached to the pallet assembly, the two elements cooperate to define an enclosed and substantially thermally insulated space around the test property.

According to one aspect of this particular embodiment, the flexible cover includes a thermally insulated fabric drape that hangs down from the overhead structure of the test site.

According to another aspect of this embodiment, the flexible cover includes one or more collapsible air ducts that are integrated with (i.e., formed in or attached to) the flexible cover. Each of the collapsible air ducts is configured to transition between a generally folded state and a generally extended state.

In accordance with yet another aspect, the flexible cover includes a mating frame that is operatively attached to one end thereof. The mating frame is configured to mate with the movable pallet assembly, and thereby positively attach the flexible cover to the pallet assembly.

According to yet another aspect, the environmental enclosure also includes an overhead cabling system that is operatively mounted to the overhead structure of the test site. The cabling system includes one or more retractable cables that are secured to the flexible cover. The cables are operable to selectively reposition the flexible cover from the first, folded position to the second, extended position (and vice versa).

In yet another aspect of the present embodiment, the environmental enclosure also includes a thermally insulated property blanket that is configured to cover the test property.

According to yet another aspect of this embodiment, the environmental enclosure also includes an overhead gantry system that is operatively mounted to the overhead structure of the test site. The overhead gantry system is operatively attached to the flexible cover, and configured to selectively relocate the same within a predetermined area of the test site.

According to even yet another aspect, the flexible cover includes a rigid enclosure ceiling that spans across an upper extent thereof.

As part of another aspect of this particular embodiment, the movable pallet assembly includes a base plate with a plurality of sidewalls that are attached thereto, and project therefrom to surround the test property. At least one of the sidewalls defines a utility penetration that extends therethrough. Each utility penetration is configured to provide an access port between the pallet assembly and testing componentry external thereto when the flexible cover is attached to the movable pallet assembly. The movable pallet assembly preferably includes a plurality of support elements that are repositionably attached to the base plate. The support elements are configured to mate with, support and accurately align the test property. The base plate also includes one or more elongated channels that are configured to engage with the test site and thereby locate and align the movable pallet assembly relative to the flexible cover for subsequent attachment thereto.

In accordance with another aspect of this embodiment, a thermally insulated floor blanket covers substantially all of the upper surface of the base plate.

In another aspect, a fluid conditioning apparatus is mounted to the base plate. The fluid conditioning apparatus is configured to operatively attach to the test property, and operates to selectively modify the temperature of fluids in the test property.

According to another embodiment of the present invention, a flexible test enclosure is provided for soaking a vehicle test property in non-ambient temperatures and testing the same. The test enclosure comprises a movable pallet assembly with a base plate that is configured to attach to and operatively support the test property thereon. A plurality of sidewalls are attached to, and project upward from the base plate to surround the test property. The movable pallet assembly is operable to deliver the test property to and from the property test room. A flexible cover is operatively mounted to the overhead structure of the test room. The flexible cover is configured to transition between an open position, in which the cover is in a raised and generally folded state, to a closed position, in which the cover is in a lowered and unfolded state. In the closed position, the flexible cover is attachable to respective upper portions of the sidewalls. The cover, when in the closed position, cooperates with the pallet assembly, when attached thereto, to define an enclosed and substantially thermally insulated space around the test property.

According to one aspect of this embodiment, the flexible cover includes an array of collapsible air ducts that are attached thereto. The air ducts are configured to fluidly communicate an overhead supply air duct directly to the movable pallet assembly. The array of collapsible air ducts are operable to transition with the flexible cover to and from the open and closed positions.

According to another aspect of the present embodiment, the movable pallet assembly includes a plurality of utility penetrations, each of which is defined through a pallet assembly sidewall. Each of the utility penetrations provides an access port between the inside of pallet assembly and testing componentry external thereto when the flexible cover is attached to the movable pallet assembly. In a similar regard, the movable pallet assembly also includes a first shaft penetration that extends through a first of the plurality of sidewalls, and a second shaft penetration that extends through a second of the plurality of sidewalls which is perpendicular to the first sidewall. Each of the shaft penetrations is configured to provide a shafting interface between the pallet assembly and a testing device external thereto when the flexible cover is attached to the movable pallet assembly.

According to yet another aspect of the present embodiment, the flexible cover includes a rigid enclosure ceiling that spans across an upper extent thereof. The enclosure ceiling includes one or more duct ports for fluidly communicating the test enclosure with an overhead return air duct.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
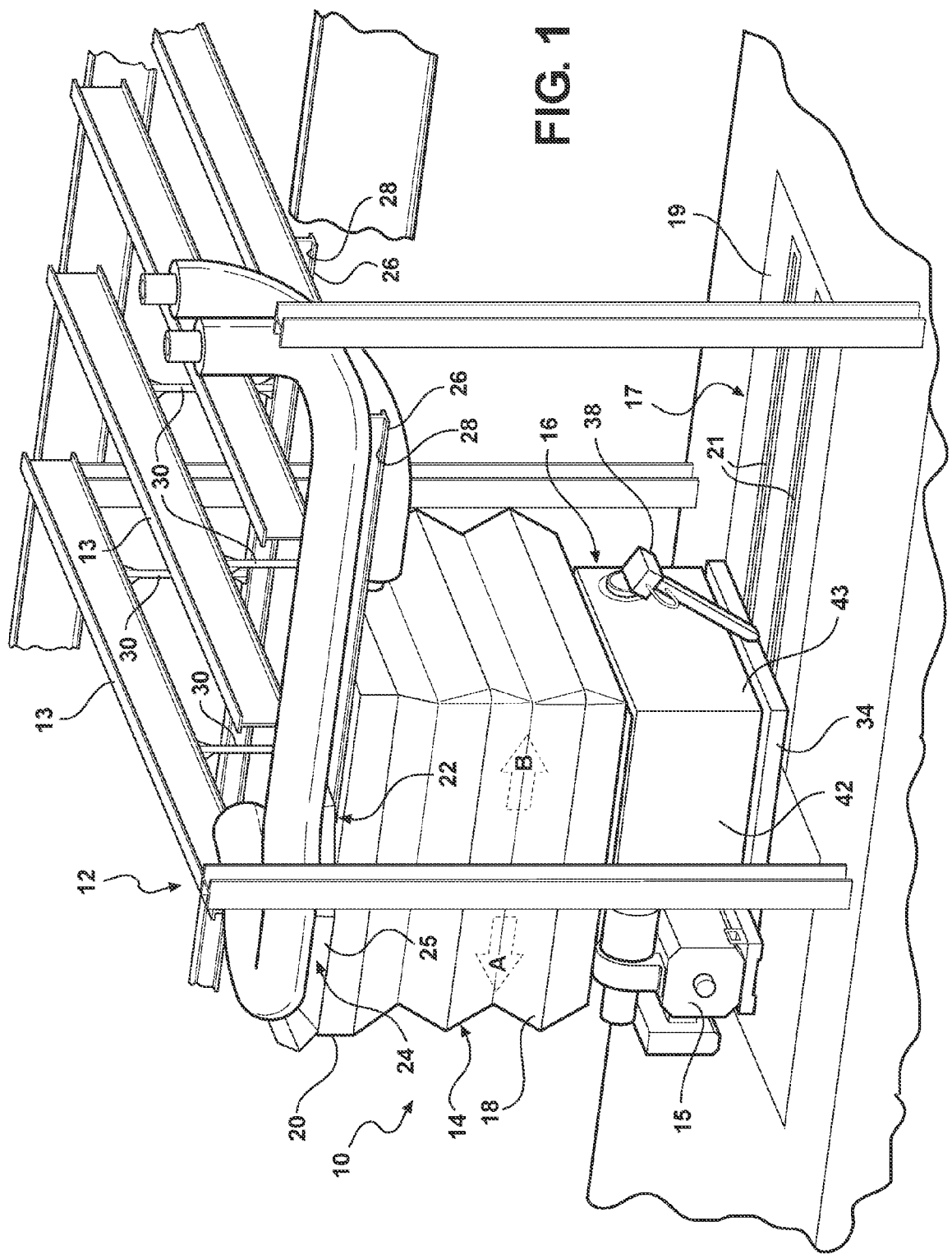
FIG. 1 is a perspective-view illustration of a flexible environmental test enclosure in accordance with a preferred embodiment of the present invention.

Referring to the drawings, wherein like reference numbers refer to like components throughout the several views, FIG. 1 illustrates a flexible environmental test enclosure in accordance with a preferred embodiment of the present invention. The particular arrangement shown in FIG. 1 is provided merely for exemplary purposes. As such, the general layout and orientation of the constituent components of the flexible environmental test enclosure may be modified within the scope of the appended claims. To this regard, it should be appreciated that the adjectives used herein to specify spatial relationships of the constituent components, such as forward, rearward, horizontal, vertical, upper, lower, etc., indicate spatial relationships as they exist with respect to their intended orientations relative to the test site when operatively oriented therein. Nevertheless, the spatial relationships specified may be varied within the scope of the claims appended hereto. Finally, the drawings presented herein are not to scale and are provided purely for instructional purposes. Thus, the individual and relative dimensions shown in the drawings are not to be considered limiting.

The flexible environmental test enclosure, which is indicated generally at 10 in FIG. 1 and referred to hereinafter as "environmental enclosure", is intended for modifying the temperature of a motor vehicle test property in fueled engine and powertrain test cells (shown in an exemplary configuration in FIG. 1 at 12) as part of a high volume, powertrain testing facility. It should be readily understood, however, that the present invention may be employed in other testing operations and facilities that would benefit from a large flexible enclosure as described herein. In addition, the environmental enclosure 10 of the present invention may be utilized purely for "off-line" test property preparation. By way of example, the environmental enclosure 10 may be setup or constructed remotely from the test cell 12, and used purely for non-ambient temperature soaking, as will be readily understood from the following detailed description.

With continued reference to FIG. 1, the environmental enclosure 10 consists generally of two primary elements: an upper enclosure portion, or flexible cover 14, and a lower enclosure portion, or movable pallet assembly 16. In the embodiment of FIG. 1, the flexible cover 14 includes a thermally insulated drape 18, which may be fabricated from synthetic fiber insulation. The drape 18 is shown with a generally box-shaped, collapsible bellow configuration, suspended at one end thereof from the overhead structure of the test site 12. In the embodiment of FIG. 1, for example, the drape 18 is mounted to and suspended from a complementary rigid enclosure ceiling 20 (more clearly seen in FIGS. 3A and 3B). The drape 18 is fixed along an upper end thereof to the outer perimeter of the enclosure ceiling 20, such that the ceiling 20 spans across and seals the upper extent of the drape 18. The enclosure ceiling 20, in turn, is attached to an array of I-shaped cross beams 13 via an overhead gantry system, designated generally by reference numeral 22 in FIG. 1, which is configured, as described below, to selectively relocate the flexible cover 14 within a predetermined area of the test site 12.

The shape, size, material, and general orientation of the flexible cover 14 may be tailored to suit the particular needs of the intended application of the environmental enclosure 10. For example, the width, length, height, or any combination thereof (e.g., overall internal volume) of the flexible cover 14 can be increased to accommodate a larger test property. In another variation, the flexible cover 14 could be suspended from a scaffold or other support structure that is buttressed by the test cell floor or sidewalls. Finally, the drape 18 and enclosure ceiling 20 could be fabricated from a similar material, and therefore preformed as a single, unitary, one-piece structure.

The flexible cover 14, namely enclosure ceiling 20, is mounted to and supported by a pair of spaced, structurally identical trolleys 24 (only one of which is visible in FIG. 1), each of which is suspended from a respective overhead transfer bridge or rail 26. Each trolley 24 is horizontally repositionable from end-to-end along the transfer rails 26, as represented by arrows A and B. In its exemplary embodiment, each trolley 24 includes a plurality of wheels (not visible) rotatably mounted to a rigid body 25 by a respective bearing (also not visible in FIG. 1). The wheels of the trolley 24 roll along a transverse track 28 that extends the length of a cavity formed by the transfer rail's I-shaped cross-section. The transfer rails 26 are hung from the I-shaped cross beams 13 via a plurality of load-bearing suspension arms 30 that extend therebetween. Although the transfer rails 26 are illustrated in FIG. 1 as stationary structures having a substantially linear configuration, it should be appreciated that the transfer rails 26 may be a curved or endless rail, and may be of the movable rail assembly type without departing from the intended scope of the present invention.

Figure 2:
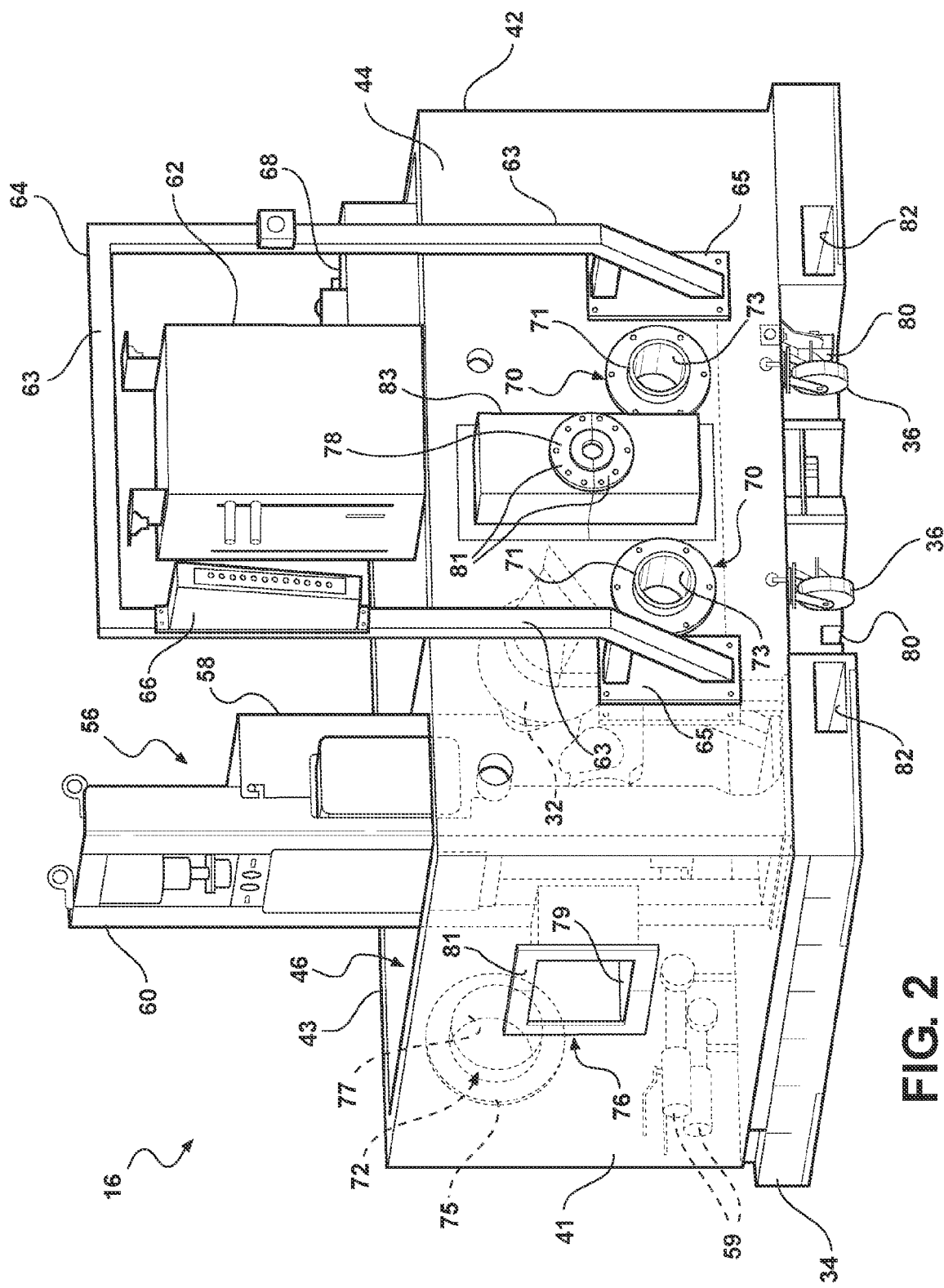
FIG. 2 is a perspective-view illustration of the movable pallet assembly of FIG. 1.
Figure 3A:
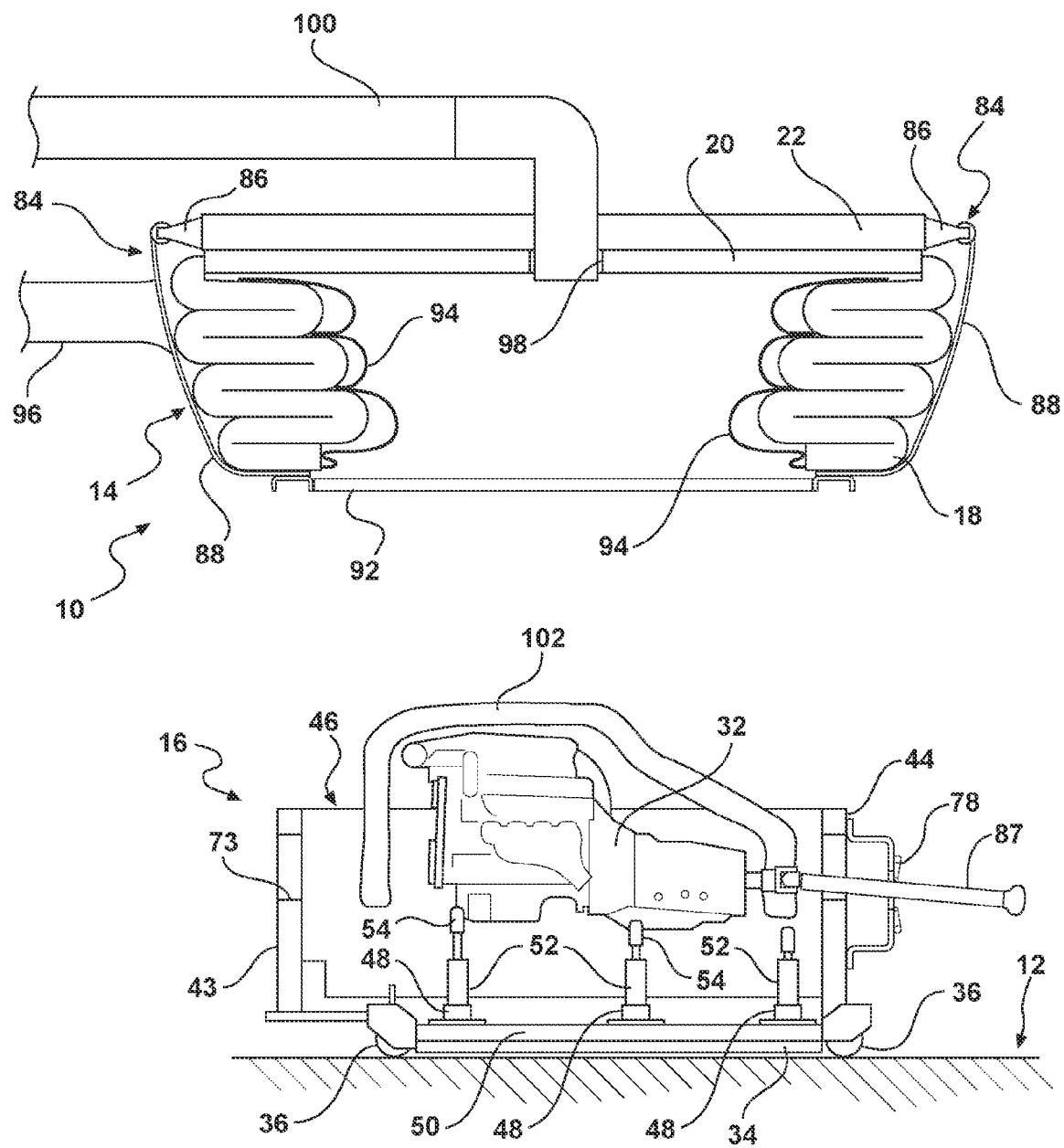
FIG. 3A is a partially broken away, schematic side-view illustration of the flexible environmental test enclosure of FIG. 1, showing the flexible cover in a first, open position.
Figure 3B:
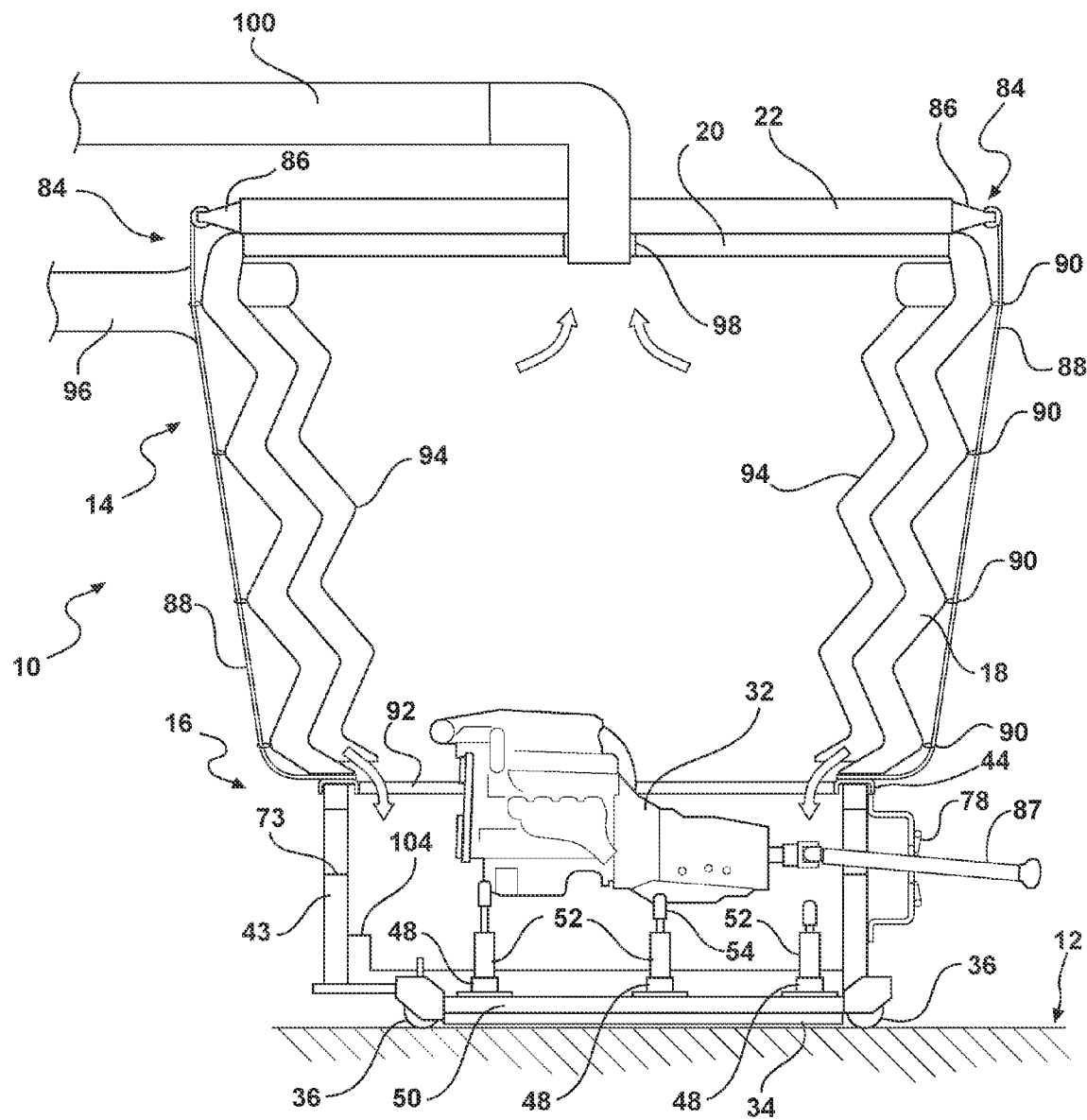
FIG. 3B is a partially broken away, schematic side-view illustration of the flexible environmental test enclosure of FIG. 1, showing the flexible cover in a second, closed position.

With reference now to both FIGS. 1 and 2, the movable pallet assembly 16 is configured to attach to, operatively support, accurately position, transport, and maintain a test property 32 for testing in the test cell 12. As used herein, the terms "property" or "test property" should be interpreted or defined to mean an assembly which includes, at a minimum, an engine, a motor, or a transmission. By way of example, the test property 32 may consist of an internal combustion engine (ICE) assembly, as seen in FIG. 2, an ICE connected to a corresponding power transmission assembly, as seen in FIGS. 3A and 3B, a hybrid-type powertrain (e.g., one or more motor/generator devices and an ICE assembly in power flow communication with a power transmission), a full powertrain, etc. Moreover, it should be recognized that the functionality of the present invention is not limited in scope to the motive power devices as embodied herein. To this regard, existing technological devices, such as fuel cells, as well as those yet to be contrived, will benefit from the invention disclosed herein.

The fundamental components of the pallet assembly 16 include a base plate 34, a means for moving the base plate 34, which may include, for example, a number of pivotable and lockable wheels 36 and/or air bearings (which are underneath the base plate 34 and therefore not visible in the drawings), and a handle 38 (FIG. 1) or other means for controlling and steering the movable pallet assembly. It should be appreciated by those skilled in the art that the pallet assembly 16 and its various constituent parts—i.e., base plate 34, wheels 36, and handle 38, can be made out of any material suitable for the intended use of the pallet assembly 16, including, but certainly not limited to, steel, aluminum, plastic, composite materials, or any combination thereof.

A plurality of sidewalls, such as first and second lateral sidewalls 41 and 42, respectively, and front and rear sidewalls 43 and 44, respectively, are attached to the base plate 34, projecting upward therefrom in a generally perpendicular manner. The sidewalls 41-44 are oriented along the outer periphery of the base plate 34 to surround the test property 32. The sidewalls 41-44 cooperate with the base plate 34 to define a lower chamber, indicated generally at 46 in FIG. 2, therebetween. The sidewalls 41-44 preferably consist of an insulated wood frame with a sheet metal skin, creating a thermal barrier between the lower chamber 46 and the environment external thereto.

Referring now to FIGS. 3A and 3B, the pallet assembly 16 also includes an array of cross beams 48 that may be selectively positioned and, preferably, repositioned fore and aft along the base plate 34. For example, the cross beams 48 are slidably mounted to a pair of laterally spaced side rails 50 (only one of which is visible in the drawings), and attachable thereto in a rigid manner, which may be by way of threaded T-bolts (not shown). Each of the individual cross beams 48 is designed to mate with and buttress one or more support elements, represented herein by an array of stanchions 52 (also referred to in the art as "locating pins"). Each stanchion 52 has a selectively adjustable height (e.g., includes a support arm which telescopes with respect to a tubular base portion). The individual stanchions 52 can be of equal or varying sizes and gauges, depending upon the particular property 32 being tested. The stanchions 52 are configured with a complementary interface 54, which may be in the nature of an engine mount, chamfered head, and the like, that mate with and secure to the property 32.

A fluid conditioning apparatus, indicated generally at 56 in FIG. 2, is mounted to the upper surface of the base plate 34, inside the lower chamber 46. The fluid conditioning apparatus 56 operatively attaches to the test property 32 (e.g., via a plurality of fluid conduits and sensors, none of which are specifically called out). The fluid conditioning apparatus 56 includes a heat exchanger core and control valve, collectively indicated at 58, that are secured to the pallet assembly 16 via test stand 60. A facility coolant manifold 59 is fluidly coupled to the heat exchanger core and control valve 58. The coolant manifold 59 regulates the distribution of facility fluid to and from the conditioning apparatus 56. The fluid conditioning apparatus 56, which is intended to simulate a standard vehicle radiator, operates to selectively modify the temperature of test property fluids during testing operations. For example, heat from the test property fluids is transferred to a facility coolant, which is then circulated through the facility coolant manifold 59 back to a central chiller system (not shown) in the test cell 12.

An instrumentation cabinet 62 is also attached to the movable pallet assembly 16. In the embodiment of FIG. 2, the instrumentation cabinet 62 is mounted to the rear sidewall 44 of the base plate 34 via an instrumentation frame 64. The instrumentation frame 64 comprises a framework of interlinked metal bars 63 that are welded to a pair of laterally distanced base plates 65. The base plates 65 are bolted to the back of the rear sidewall 44, outside of the lower chamber 46 of the pallet assembly 16. The instrumentation cabinet 62 houses the electronic instrumentation that receives signals from test property mounted sensors (not shown), and converts these signals into digital parameters that are processed by a Test Automation System (TAS) for data and control calculations. These measurements are generally test specific, and may include, for example, pressures, temperatures, flow rates, speeds, and torque values. A pressure transducer enclosure 66, which houses pressure measurement instrumentation, is secured to a lateral bar 63 of the instrumentation frame 64 (e.g., via screws). Finally, a direct current distribution box 68 is mounted to the upper surface of the base plate 34, inside the lower chamber 46. The direct current distribution box 68, which is configured to simulate the motor vehicle's electrical distribution system, operates to feed DC power to the test property 32.

In the exemplary embodiment presented in FIG. 2, each of the sidewalls 41-44 includes one or more utility penetrations. Each utility penetration is designed to provide a thermally resilient access port to the lower chamber 46—i.e., creating a passage between the inside of the pallet assembly 16 and testing equipment external thereto. For instance, the rear sidewall 44 includes two utility penetrations 70. Each of these exemplary utility penetrations 70 comprise a pair of opposing, substantially identical, hollow metal hubs 71 (two of the four being visible in FIG. 2) that are respectively bolted to the inner and outer surfaces of the rear sidewall 44 in aligned, opposing relation to one another to form a circular channel 73 that extends through the sidewall 44. The neck of each individual hub 71 is threaded so as to mate with and threadably lock to a complementary threaded end of exhaust ducts (not shown) that are adapted for evacuating exhaust gases from the test property 32.

The front sidewall 43 includes a pair of utility penetrations (one of which is shown hidden in FIG. 2 at 72) that are similarly configured with the utility penetrations 70 described above. That is, the utility penetration 72 includes a pair of opposing, substantially identical hubs 75 that are respectively bolted to the inner and outer surfaces of the front sidewall 43 in aligned, opposing relation to one another to form a circular channel 77 that extends through the sidewall 44. The threaded neck of the hub 75 is configured to mate with and threadably attach to a complementary harness (not shown) for instrumentation cables, fuel lines, transmission shift cables, power cables, etc., that must be fed through the sidewall 43 into the lower chamber 46.

With continuing reference to FIG. 2, the first and second lateral sidewalls 41, 42 also include a shaft penetration 76 (one of which is visible in FIG. 2) that extends therethrough. This particular representative shaft penetration 76 consists of a singular, one-piece, hat-like metal hub 81 that is press-fit with and otherwise fastened or adhered to the sidewall 41. The shaft penetration 76 defines a generally square channel 79, which is shaped and sized, for example, to allow a respective halfshaft (not shown) to pass through the sidewall 41 to operatively connect a dynamometer 15 (FIG. 1) to the test property 32 (e.g., to the transaxle differential in a front-wheel drive powertrain configuration).

There is at least one shaft penetration 78 that extends through the rear sidewall 44 of the movable pallet assembly 16. The shaft penetration 78 provides a shafting interface between the pallet assembly 16 and a testing device, such as dynamometer 15 of FIG. 1, external thereto. In the exemplary configuration presented in FIG. 2, the shaft penetration 78 includes a pair of substantially identical, semi-circular 81 plates that are attached (e.g., via bolts) to a front extension 83 that is, in turn, positively attached to the outer surface of the rear sidewall 44. The semi-circular plates are oriented to create a circular hole for receiving a driveshaft 87 (FIG. 3A) or other shafting interface.

The test cell 12 will generally include a receiving station, which is designated generally in FIG. 1 by reference numeral 17. The receiving station 17 is designed to mate with, receive, and secure the movable pallet assembly 16 during pre-soak and/or testing. In the representative embodiment presented herein, the receiving station 17 consists essentially of a bed plate 19 with a docking station (not visible) at one end thereof. The base plate 34 includes one or more longitudinally elongated, generally square-shaped channels 80 that are configured to be received by and mate with a respective guide rail 21. The guide channels 80, through the interplay with the guide rails 21, act to locate and align the movable pallet 16 assembly relative to the flexible cover 14 for subsequent attachment thereto. A pair of longitudinally elongated, laterally offset, generally square-shaped fork truck slots 82 is built into the base plate 34 of the pallet assembly 16. The fork truck slots 82 are used, for example, when the pallet 16 air bearings have failed, or when the pallet 16 must be moved to a location that does not have compressed air available to feed the air bearings.

In accordance with the present invention, the flexible cover 14 is configured to transition from a first, open position (shown in FIG. 3A), in which the fabric drape 18 is in a raised, generally folded and condensed state, to a closed position (as seen in FIG. 3B), in which the cover 18 is in an extended, lowered and generally unfolded state. In the representative embodiment illustrated in FIGS. 3A and 3B, the environmental enclosure 10 utilizes an overhead cabling system, indicated generally at 84, to selectively reposition the flexible cover 14 from the raised position to the lowered position, the lowered position to the raised position, and anywhere therebetween. The overhead cabling system 84 ideally includes four identical pulleys 86, only two of which are visible in FIGS. 3A and 3B. Each pulley 86 includes a sheave that is rotatably mounted to the rigid enclosure ceiling 20 by a block, which projects horizontally outward from one of the four corners thereof. A corresponding number of retractable cables 88 are secured at one end of the flexible cover 14—e.g., to the lower portion of the drape 18. Each cable 88 is passed up along a corner edge of the drape 18, through a plurality of guide loops 90, and mated with a respective pulley 86. Retraction of each cable 88, whether it be through mechanical activation (e.g., crank or draw cord) or electro-mechanical means (e.g., an electric motor), will raise the drape 18, whereas extension of the cables 88 will act to lower the drape 18. It should be readily recognized that alternate means for raising and lowering the flexible cover 14, such as pneumatic, hydraulic, electromechanical, and other mechanical devices or systems, may be employed without departing from the scope of the claimed invention.

In the raised position, the flexible cover 14 allows access to the test property 32 and other componentry within the lower chamber 46. In addition, raising the flexible cover 46 allows the upper portion of the enclosure 10 to be stowed out of the way so testing that does not involve climatic conditioning may be performed in the test cell 12 without hindrance. In the closed position, on the other hand, the flexible cover 14 is attachable to respective upper portions of the sidewalls 41-44. By way of example, and not limitation, the flexible cover 14 includes a mating frame 92 that is operatively attached to the lower end of the drape 18. The mating frame 92 includes attachment means, such as adapters and clamps (not shown) that mate with and attach to one or more of the sidewalls 41-44, and thereby positively attach the flexible cover 14 to the pallet assembly 16. The cover 14, when in the closed position (FIG. 3B), cooperates with the pallet assembly 16, when attached thereto, to define an enclosed and substantially thermally insulated space around the test property. That is, in the lowered position, the flexible cover 14 of the enclosure 10 mates with the pallet assembly 16 of the enclosure 10 to form a complete environmental enclosure.

The flexible cover 18 includes an array of collapsible, elongated air ducts, two of which are illustrated in FIGS. 3A and 3B and indicated at 94. The air ducts 94 are integrated with (i.e., attach to or formed with) an inner surface of the drape 18, in a generally vertical orientation. The air ducts 94 create a fluid conduit between an overhead supply air duct 96 and the pallet assembly 16, directly fluidly communicating the supply air duct with the lower chamber 46. The array of collapsible air ducts 94 are preferably fabricated from the same insulated fabric material as the drape 18 such that the collapsible air ducts 94 transition with the flexible cover 14 to and from the open and closed positions, folding and extending with the drape 18. The non-ambient air that is fed through the collapsible air ducts 94 into the lower chamber 46 is then recirculated up through the enclosure 10, and out through a duct port 98 formed in the ceiling 20 to an overhead return air duct 100.

In preferred practice, the environmental enclosure 10 described herein is capable of operating with an interior temperature range of approximately −45 degrees Celsius (° C.) to 80° C., and is capable of maintaining 5° C. air outlet temperature while removing 80,000 BTU/hour of convection heat energy from the enclosure. The air handler (not shown) is sized to deliver 1600 Standard cubic feet per minute (scfm) from ambient to −43° C. Moreover, the upper and lower enclosure portions are designed to withstand the radiated heat, fluids, and other hazards from various test property configurations.

The environmental enclosure 10 is also designed to limit the temperature rise/drop of the test property 32 during transport thereof such that the test article can be re-stabilized within 30 minutes (e.g., all skin temperatures and fluid temperatures returned to within 2° C. of soak temperature). For example, the environmental enclosure 10 presented in FIGS. 3A and 3B includes a thermally insulated property blanket 102 (FIG. 3A) that is sized and shaped to cover the test property 32. To this regard, a thermally insulated floor blanket 104 (FIG. 3B) covers preferably the entire upper surface of the base plate 34. The insulated blankets 102, 104 create thermal dams that reduce the dissipation/transfer of thermal energy to and from the ambient atmosphere.

One of the primary benefits of the present invention is that fueled engine testing can be performed in this type of enclosure without the need for a specialized environmental test cell or a rigid environmental enclosure. Specialized environmental test cells of the prior art are very expensive to construct and to operate, whereas this invention is relatively inexpensive in comparison. In addition, rigid environmental enclosures are large and are not easily adaptable to portable test pallet systems, which is critical in many instances to realize the added efficiency associated with the use of a pallet system when performing engine and powertrain environmental testing. The present design also allows for testing workflow processes which require offline temperature soaking of test property. The products under test may then be moved into the test cell for a short re-soak and actual test. Rigid enclosures are not adequately adaptable to this workflow process. Also, rigid enclosures of the prior art often require special entry precautions since they are deemed confined spaces. Finally, the pallet assembly configuration described hereinabove can accommodate pipes that operate at elevated temperatures, and shafts that rotate at very high speeds. These advantages are generally unrealized in an environmental enclosure that is constructed completely from fabric.

While the best modes for carrying out the present invention have been described in detail, those familiar with the art to which this invention relates will recognize various alternative designs and embodiments for practicing the invention within the scope of the appended claims.

The invention claimed is:

1. An environmental enclosure for modifying a temperature of a motor vehicle test property, the environmental enclosure comprising:
   a movable pallet assembly configured to support the test property thereon, and
   operable to deliver the test property to and from a property test site; and
   a flexible cover operatively mounted to the test site and configured to transition between a first position, in which the cover is in a generally folded state, and a second position, in which the cover is extended and operable to attach to the pallet assembly;
   wherein the flexible cover includes a thermally insulated drape hanging from an overhead structure of the test site and
   wherein the flexible cover cooperates with the pallet assembly when attached thereto to define an enclosed and substantially thermally insulated space around the test property.

2. The environmental enclosure of claim 1, wherein the flexible cover includes at least one collapsible air duct integrated therewith, wherein the at least one collapsible air duct is configured to transition between a generally folded state and a generally extended state.

3. The environmental enclosure of claim 1, wherein the flexible cover includes a mating frame operatively attached to one end thereof, wherein the mating frame is configured to mate with and positively attach to the movable pallet assembly.

4. The environmental enclosure of claim 1, further comprising:
an overhead cabling system operatively mounted to an overhead structure of the test site, wherein the cabling system includes at least one retractable cable secured to the flexible cover and operable to selectively transition the flexible cover between the first and second positions.

5. The environmental enclosure of claim 1, further comprising:
a thermally insulated property blanket configured to cover the test property.

6. The environmental enclosure of claim 1, further comprising:
an overhead gantry system operatively mounted to an overhead structure of the test site, wherein the overhead gantry system is operatively attached to the flexible cover and configured to selectively relocate the same within a predetermined area of the test site.

7. The environmental enclosure of claim 1, wherein the flexible cover includes a rigid enclosure ceiling spanning across an upper extent thereof.

8. The environmental enclosure of claim 1, wherein the movable pallet assembly includes a base plate with a plurality of sidewalls attached thereto and projecting therefrom to at least partially surround the test property.

9. The environmental enclosure of claim 8, wherein at least one of the plurality of sidewalls defines a utility penetration therethrough configured to provide an access port between the pallet assembly and testing componentry external thereto when the flexible cover is attached to the movable pallet assembly.

10. The environmental enclosure of claim 8, wherein at least one of the plurality of sidewalls defines a shaft penetration therethrough configured to provide a shafting interface between the pallet assembly and a testing device external thereto when the flexible cover is attached to the movable pallet assembly.

11. The environmental enclosure of claim 8, wherein the movable pallet assembly includes a plurality of support elements repositionably attached to the base plate and configured to mate with, support and accurately align the test property.

12. The environmental enclosure of claim 8, wherein the base plate defines at least one elongated channel configured to engage with the test site and thereby locate and align the movable pallet assembly relative to the flexible cover for attachment thereto.

13. The environmental enclosure of claim 8, further comprising:
a thermally insulated floor blanket covering substantially all of an upper surface of the base plate.

14. The environmental enclosure of claim 8, further comprising:
a fluid conditioning apparatus mounted to the base plate and configured to operatively attach to the test property, wherein the fluid conditioning apparatus is operable to selectively modify a temperature of fluids in the test property.

15. A flexible test enclosure for soaking a vehicle test property in non-ambient temperatures and testing the same, the test enclosure comprising:
a movable pallet assembly having a base plate configured to attach to and operatively support the test property thereon, and a plurality of sidewalls attached to and projecting from the base plate to surround the test property, wherein the movable pallet assembly is operable to deliver the test property to and from a property test room; and
a flexible cover operatively mounted to an overhead structure of the test room and configured to transition between an open position, in which the cover is in a raised and generally folded state, to a closed position, in which the cover is in a lowered state and attachable to respective upper portions of the plurality of sidewalls;
wherein the cover when in the closed position cooperates with the pallet assembly when attached thereto to define an enclosed and substantially thermally insulated space around the test property.

16. The test enclosure of claim 15, wherein the flexible cover includes an array of collapsible air ducts attached thereto and configured to fluidly communicate an overhead air duct with the movable pallet assembly, wherein the array of collapsible air ducts are operable to transition with the flexible cover to and from the open and closed positions.

17. The test enclosure of claim 15, wherein the movable pallet assembly includes a plurality of utility penetrations defined through at least one of the plurality of sidewalls, wherein each of the plurality of utility penetrations is configured to provide an access port between the pallet assembly and testing componentry external thereto when the flexible cover is attached to the movable pallet assembly.

18. The test enclosure of claim 15, wherein the movable pallet assembly includes a first shaft penetration defined through a first of the plurality of sidewalls, and a second shaft penetration defined through a second of the plurality of sidewalls which is perpendicular to the first sidewall, wherein each of the shaft penetrations is configured to provide a shafting interface between the pallet assembly and a testing device external thereto when the flexible cover is attached to the movable pallet assembly.

19. The test enclosure of claim 15, wherein the flexible cover includes a rigid enclosure ceiling spanning across an upper extent thereof, the enclosure ceiling defining at least one duct port therethrough for fluidly communicating the test enclosure with an overhead air duct.

* * * * *